(12) United States Patent
Leung et al.

(10) Patent No.: US 6,769,055 B1
(45) Date of Patent: Jul. 27, 2004

(54) TWO-PART MEMORY ADDRESS GENERATOR

(75) Inventors: Eric Tsin-Ho Leung, San Jose, CA (US); Ching Yu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/263,948

(22) Filed: Mar. 8, 1999

(51) Int. Cl.[7] .............................................. G06F 12/00
(52) U.S. Cl. ........................ 711/220; 711/154; 711/171
(58) Field of Search ................................ 711/220, 154, 711/171, 172

(56) References Cited

U.S. PATENT DOCUMENTS

| | | | | |
|---|---|---|---|---|
| 4,710,916 A | * | 12/1987 | Amstutz et al. ............. 370/424 |
| 5,515,376 A | | 5/1996 | Murthy et al. ............. 370/85.13 |
| 5,757,795 A | * | 5/1998 | Schnell ........................ 370/392 |
| 5,963,977 A | * | 10/1999 | Gold et al. ................. 711/154 |
| 6,263,374 B1 | * | 7/2001 | Olnowich et al. .......... 710/316 |
| 6,542,502 B1 | * | 4/2003 | Herring et al. ............. 370/390 |

* cited by examiner

*Primary Examiner*—Mano Padmanabhan
*Assistant Examiner*—Paul Baker (57) ABSTRACT

A memory address generator for a multiport data communication system storing received data packets in a memory having a plurality of storage areas. The data communication system has a plurality of receive ports receiving the data packets and a queue of addresses of a plurality of storage areas in the memory available for storing the received data packets. The address generator generates memory addresses to store the received data packets in the plurality of storage areas of the memory and includes first and second registers. The first register receives an address from the queue of addresses and provides a first part of the memory address, and the second register counts write cycles to the memory and provides the count result as a second part of the memory address.

4 Claims, 8 Drawing Sheets

TWO-PART MEMORY ADDRESS GENERATOR

FIELD OF THE INVENTION

This invention relates to data communication systems, and more particularly, to a method and mechanism for generating addresses for memory storage of frame data received by a communication switch.

BACKGROUND ART

A multiport communication switch may be provided in a data communication network to enable data communication between multiple network stations connected to various ports of the switch. A logical connection may be created between receive ports and transmit ports of the switch to forward received frames to appropriate destinations. Based on frame headers, a frame forwarding arrangement selectively transfers received frame data (packet data) to a destination station.

Data packets received at a receive port of the communication switch are transferred to an external memory and subsequently retrieved and transmitted from a respective transmit port of the switch. Each address of the external memory requires 18-bits and the external memory address would conventionally be determined using 18-bit logic. However, 18-bit logic is complicated, relatively slow and requires a large amount of chip area to implement.

Therefore, it would be desirable to generate the external memory address for the frame data without using complicated 18-bit logic and thus, increase speed and efficiency of chip area utilization.

DISCLOSURE OF THE INVENTION

The invention provides a novel address generator for generating memory addresses for storing data packets received by a multiport data communication system in storage areas of a memory. The data communication system comprises a plurality of receive ports for receiving the data packets and a queue of addresses of a plurality of storage areas in the memory available for storing the received data packets. The address generator includes a first register receiving an address from the queue and providing a first part of the memory address, and a second register counting write cycles to the memory and providing the count result as a second part of the memory address.

The invention provides also a novel method of generating memory addresses for storing the received data packets in storage areas of the memory and comprises inputting an address from the queue of addresses to a first register and providing a first part of the memory address, counting write cycles to the memory with a second register and providing the count result as a second part of the memory address, and combining the first part and the second part to provide the memory address.

In a preferred embodiment, each storage area of the memory stores a predetermined number of data blocks corresponding to one received data packet, and when a number of data blocks representing the one received data packet is greater than the predetermined number, a plurality of storage areas store the number of data blocks.

BEST MODE FOR CARRYING OUT THE INVENTION

Figure 1:
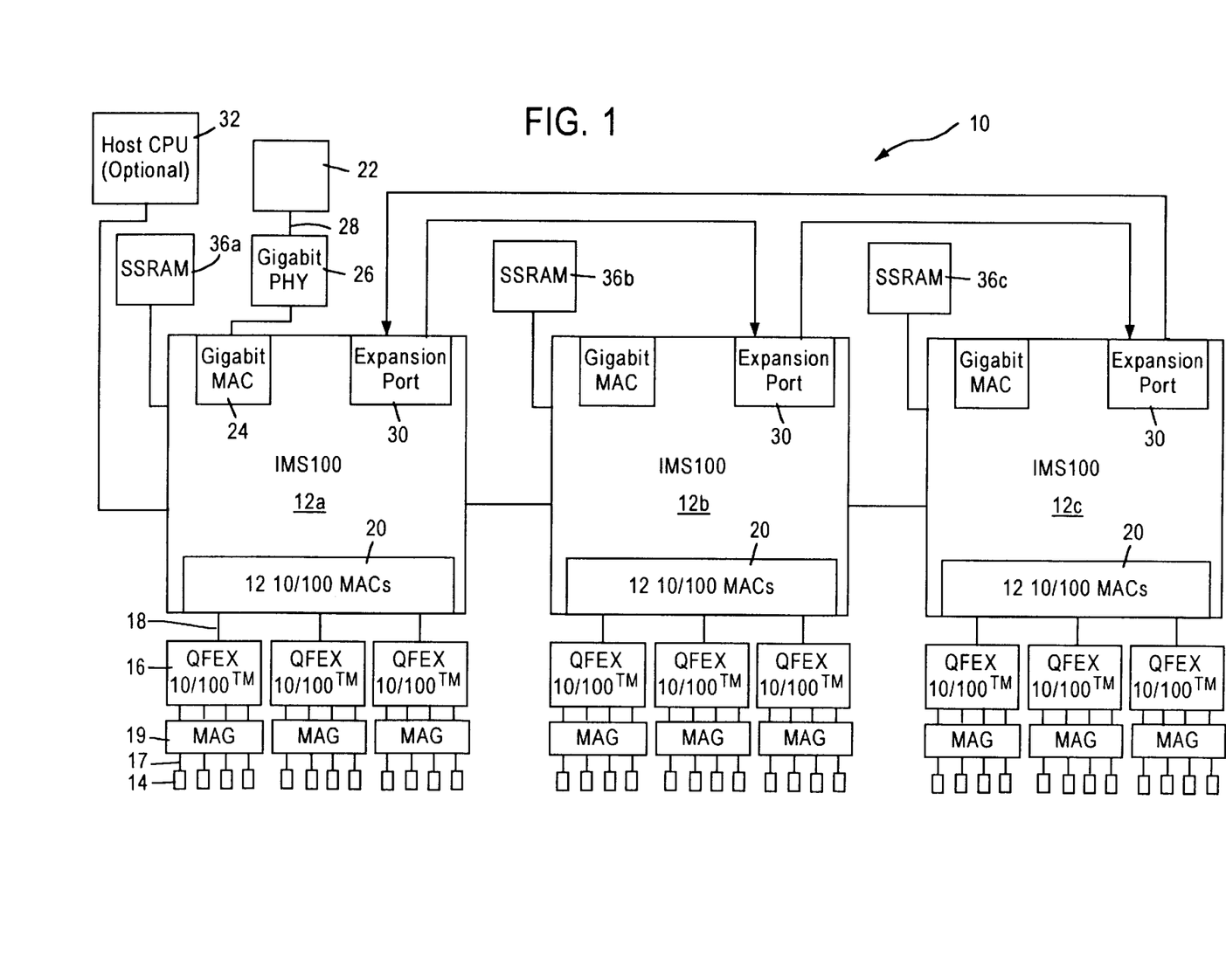
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 (12a–12c) that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802–3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time, known as the interpacket gap interval (IPG), after the deassertion of a receive carrier on the media. If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 PHY transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
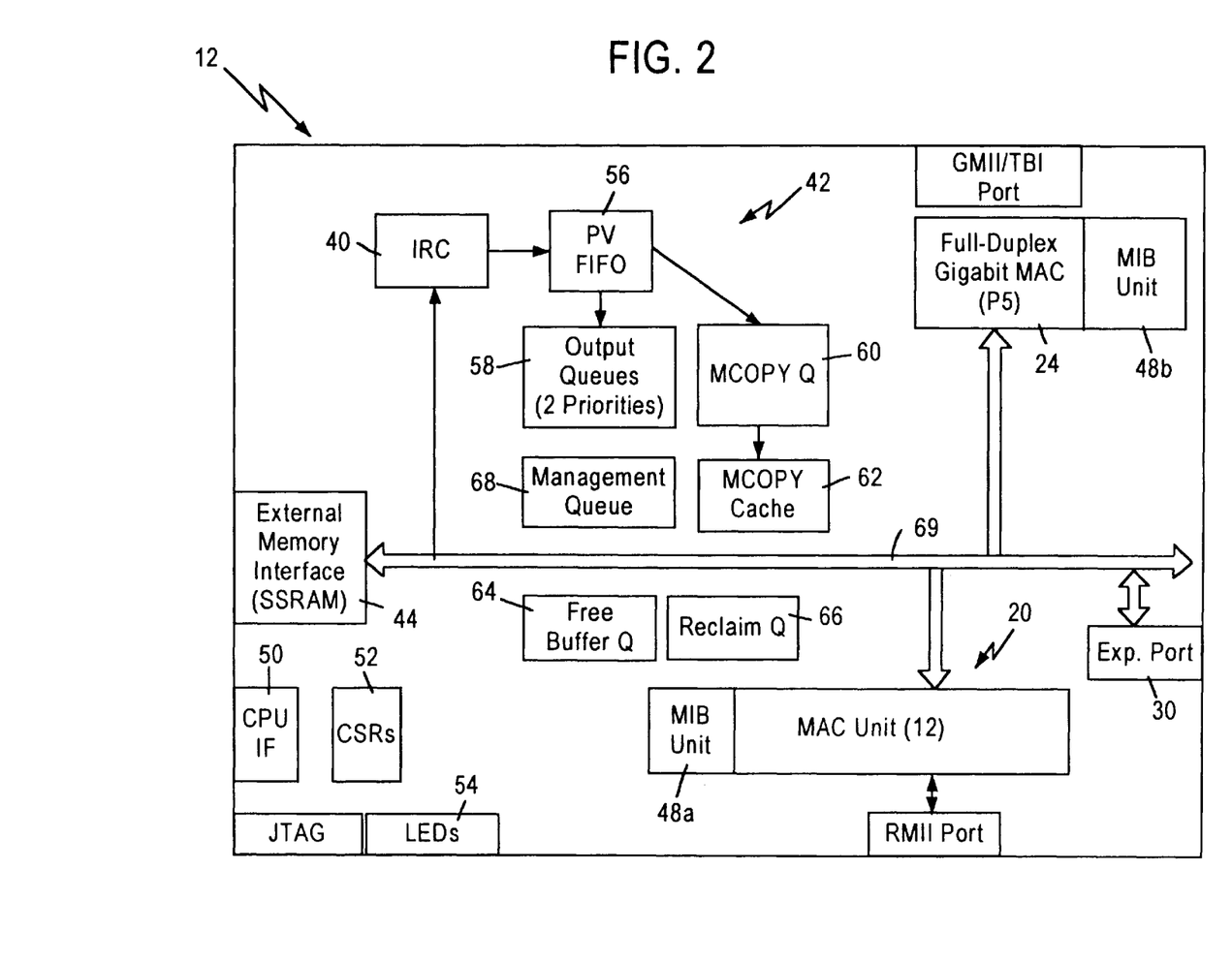
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, a buffer memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the memory 36 for storage of received frame data, memory structures, and MIB counter information. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The External Memory 36 is addressable as upper and lower banks of 128K in 64-bit words. The size off the external memory 36 is preferably at least 1 Mbytes, with data transfers possible on every clock cycle through pipelining. Additionally, the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52. The internal decision making engine 40, referred to as an internal rules checker (IRC), makes frame forwarding decisions for data packets received from one source and forwarded to at least one destination station.

The multiport switch 12 also includes an LED interface 54 that clocks out the status of conditions per port and drives external LED logic. The external LED logic drives LED display elements that are humanly readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 using the frame pointer.

The IRC 40 monitors (i.e., "snoops") the data bus to determine the frame pointer value and the header information of the received packet (including source, destination, and VLAN address information). The IRC 40 uses header information to determine which MAC ports will output the data frame stored in the external memory 36 at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN (virtual LAIN) tag header that identifies the frame information as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the frame data for transmission (e.g., 10/100 MAC ports 1–12, Gigabit MAC port, and/or Expansion port). The port vector FIFO 56 decodes the forwarding descriptor including the port vector, and supplies the frame pointers to the appropriate output queues 58 that correspond to the output MAC ports to receive the data packet transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68 which can be processed by the host CPU 32 via the CPU interface 50.

The multicopy queue 60 and the multicopy cache 62 keep track of the number of copies of the data frame that are fetched from the respective output queues 58, ensuring that the data packet is not overwritten in the external memory 36 until the appropriate number of copies of the data packet have been output from the external memory 36. Once the number of copies corresponds to the number of ports specified in the port vector FIFO 56, the frame pointer is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figures 3, 3A:
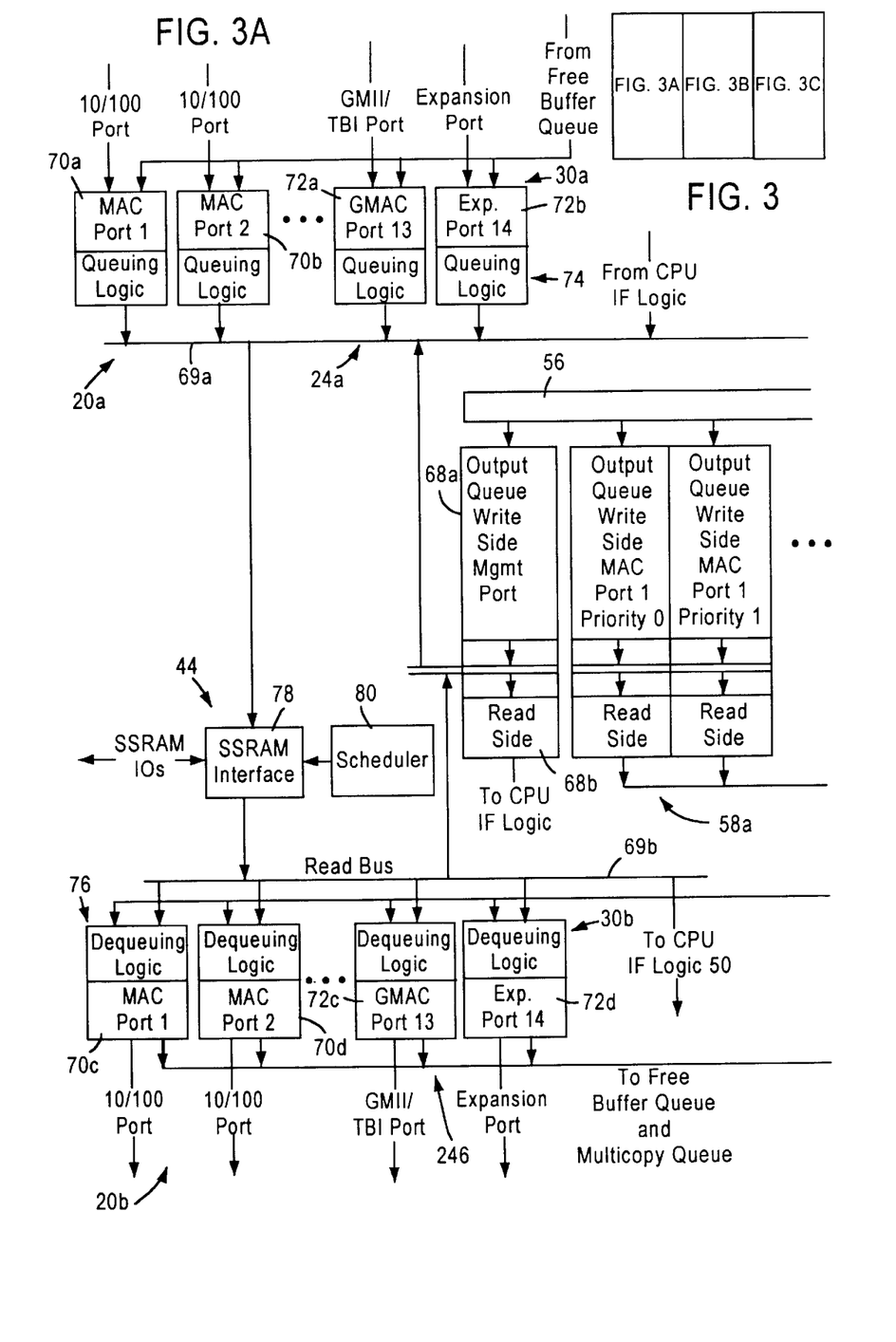
FIG. 3 is a block diagram illustrating in detail the switching subsystem of FIG. 2.
Figure 3B:
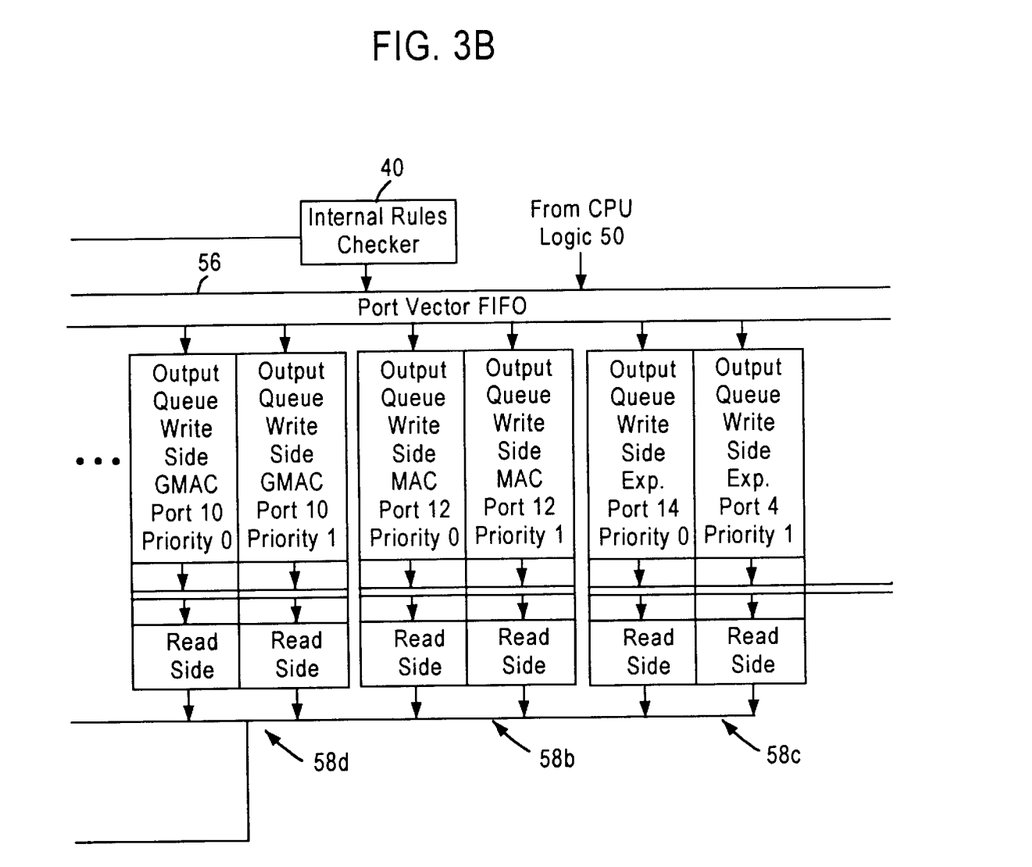
Figure 3C:
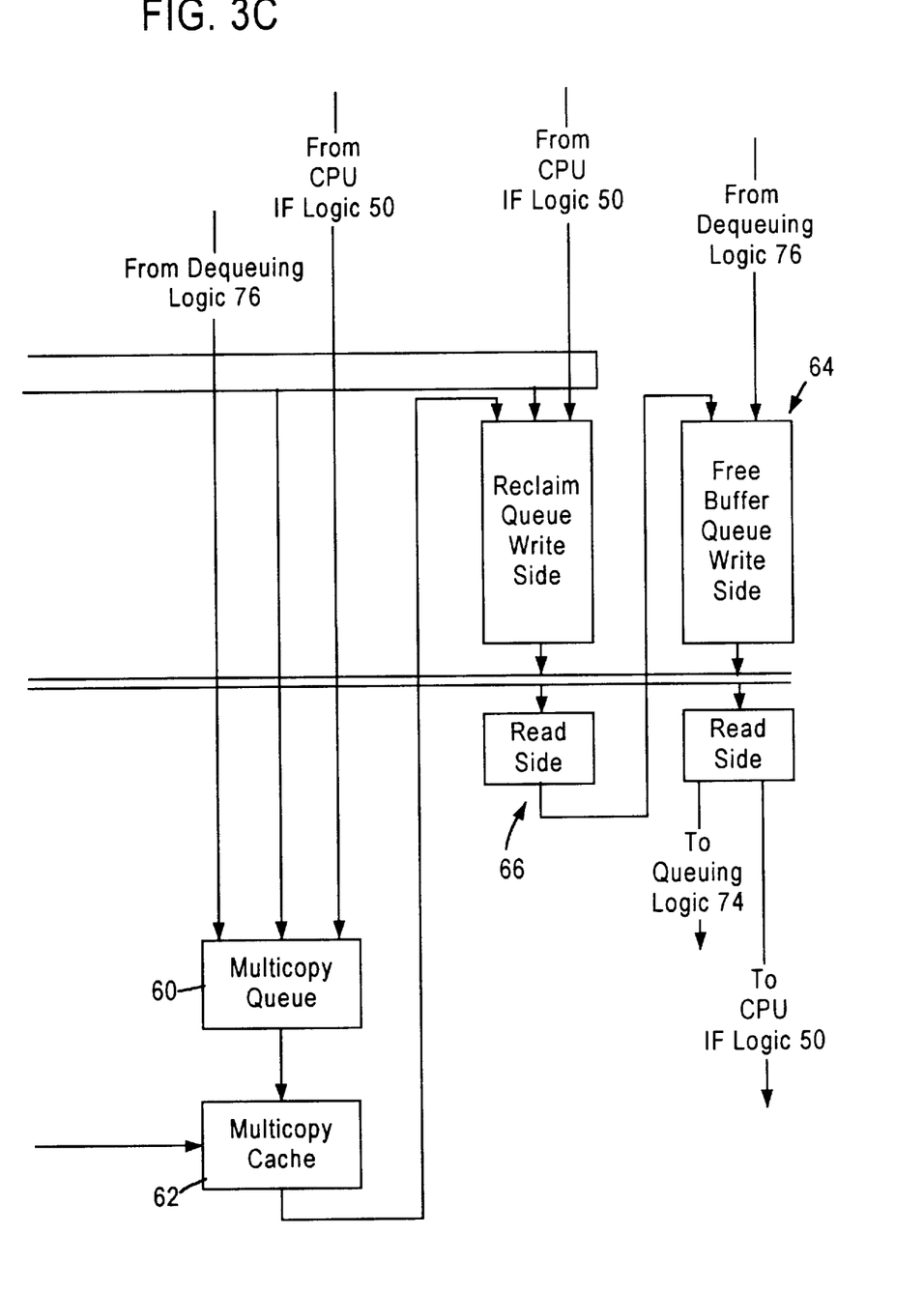

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include 12 MAC modules (only two of each shown and referenced by numerals 70a, 70b, 70c and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit potrion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives. between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

Figure 4:
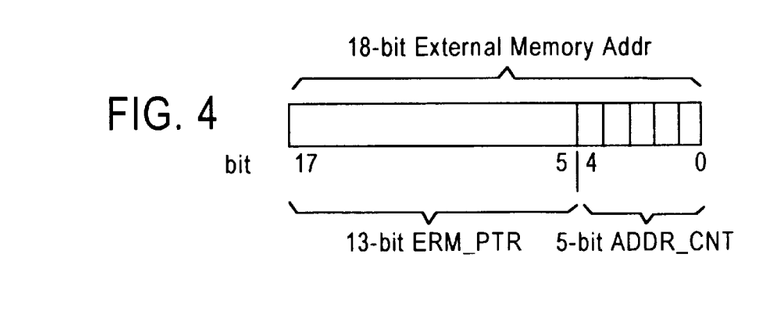
FIG. 4 is a diagram illustrating an external memory address generated by the present invention.

As shown in FIG. 4, the external memory address at which the respective queuing logic 74 writes buffer header information and frame data comprises 18 bits and is constructed of two parts. The first part of the external memory address is the 13-bit frame pointer (FMR_PTR) obtained from the free buffer queue 64 and pointing to the address in the external memory 36 of the buffer at which the frame is be stored. Each buffer is 256 bytes long and each burst for each write to the external memory 36 is 8 bytes (64-bits). Therefore, each buffer is formed of 32 (256÷8) memory positions and it takes 32 writes to the external memory to fill up each buffer. The first part of the external memory address (13-bit frame pointer) points to one 8 byte (64-bit) location in the external memory 36 which is the beginning of the buffer. However, after the initial 8 bytes are written to this location in the external memory 36, a mechanism must be provided to generate the address (inside the respective buffer) at which the next portion of the frame is to be stored.

This is done by using a 5-bit offset (ADDR_CNT) inside each buffer. The 5-bit offset forms the second part of the 18-bit external memory address. Thus, the 13 most significant bits of the external memory address indicate the address (frame pointer) where the buffer begins and the 5 least significant bits indicate the offset position of each buffer at which the information is to be written.

Since there are 32 positions in each buffer to which information can be written. The offset position for the first 8 bytes of frame information written to the designated buffer is, for example, the "0" offset position. That is, the first 8 bytes of frame information is written to the memory address indicated by the frame pointer at position "0" (first position) of the buffer (binary 00000). The next 8 bytes of frame information is written to the memory address indicated by the frame pointer at position "1" (second position) of the buffer (00001 in binary). The final position in any buffer at which frame information can be written is the memory address indicated by the frame pointer at position "31" (thirty-second position) of the buffer (binary 11111). Therefore, by keeping track of the offset position of each buffer at which each 8 bytes of frame information is written, the address in the external memory 36 at which each 8 bytes of frame information is written is determined.

Figure 5:
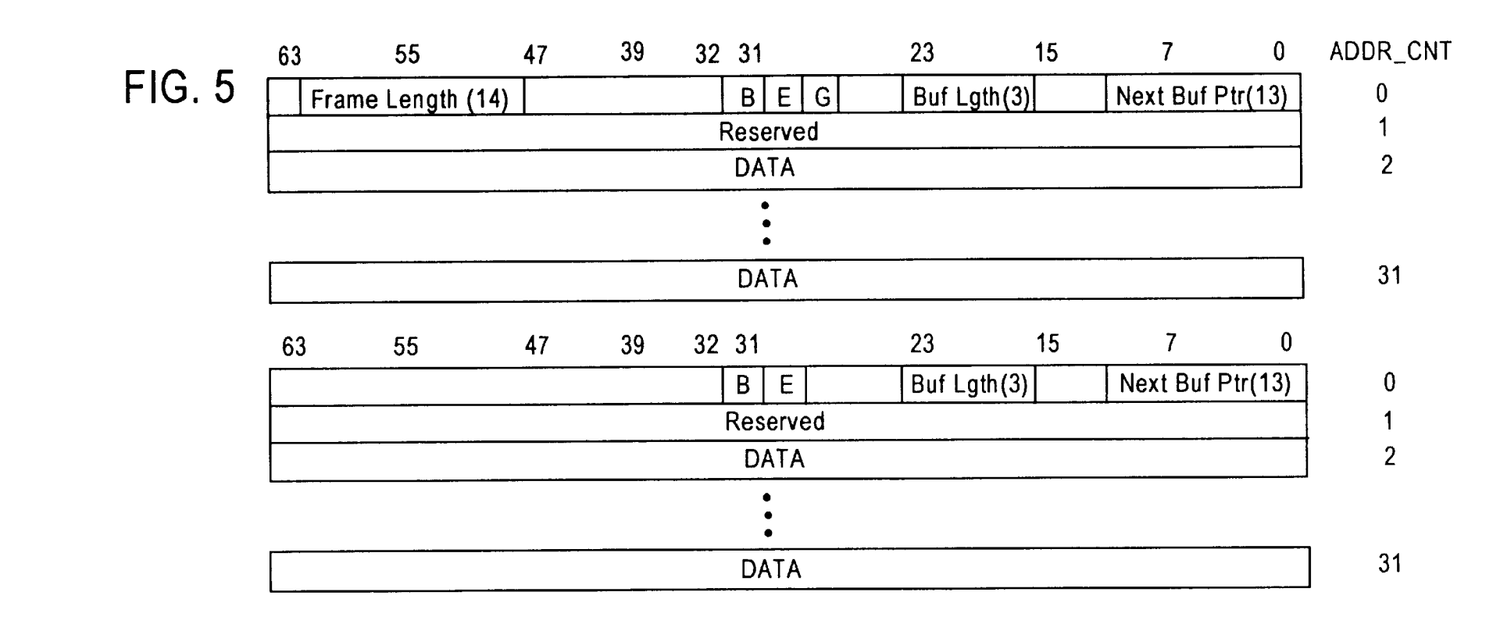
FIG. 5 is a block diagram of apparatus for generating the external memory address.

When a frame is longer than any one buffer, additional buffers can be used to write the frame by chaining buffers together with an address pointer in each buffer header. This pointer, called the next buffer pointer, indicates the next buffer's location in external memory 36. The buffer headers also contain other information about the frame data contained in the buffer. Each buffer header is comprised of 16 bytes and the remaining 240 bytes (256 total) are used for frame data. The first buffer header for a frame uses 8 bytes with 8 bytes unused. Each subsequent buffer's header for a common frame uses 4 bytes with 12 bytes unused. The first and subsequent buffer header formats of a common frame (chained buffers) are shown in FIG. 5 and contain the following fields.

Frame Length (bits 61–48): the total length of the received frame.

B Bit (beginning of Frame) (bit 31): indicates that this first buffer contains the beginning of the frame. This bit is set to "1" in the first buffer used by a frame and cleared to "0" in all other buffers. This bit is used for diagnostic purposes.

E Bit (End of Frame Marker) (bit 30): indicates that this is the last buffer for a frame. When the E bit is set, there are not more buffers in a chain, and the contents of the next buffer pointer are undefined.

G Bit (Good Frame) (bit 29): indicates that this frame did not experience any receive errors. The G bit is used for diagnostic purposes only and is not checked by the MAC Dequeuing Logic.

Buffer Length (bits 23–16): the number of bytes in the data portion of this buffer only, beginning with the first byte after the buffer header.

Next Buffer Pointer (bits 12–0): the Address pointer to the next buffer in a chain of buffers. The next buffer pointer is undefined if the E bit is set.

Figure 6:
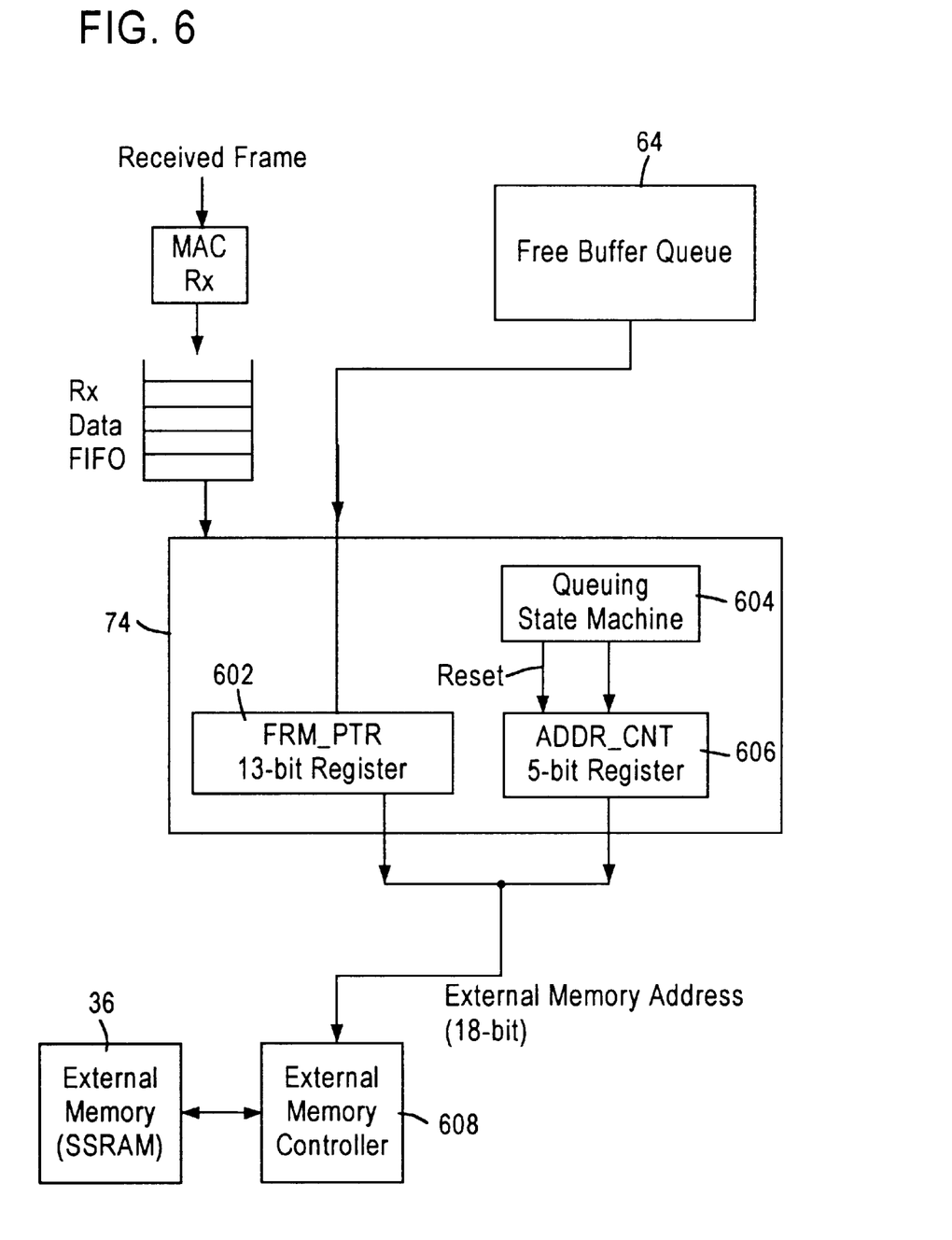
FIG. 6 is a diagram illustrating buffer header formats for chained buffers.

The portion of the queuing logic 74 which generates the two-part external memory address is shown in FIG. 6. It is understood that the queuing Logic 74 includes additional portions (not shown) performing other functions. Frame data is input to the MAC receive portion and transferred to the corresponding internal receive FIFO. As noted earlier, MAC Queuing Logic 74 fetches frame pointers from the free buffer queue 64. This frame pointer is input to 13-bit register 602 (FMR_PTR). A queuing state machine 604 controls reading frame data from the Rx data FIFO and writing the read frame data to the external memory 36 using a write enable control signal. Each generation of the write enable control signal for each buffer which is written to is input to 5-bit register 606 (ADDR-CNT) and accumulated, providing the 5-bit offset for each 18-bit external memory address.

When the size of a frame is less than 1 buffer, the queuing state machine 504 resets the 5-bit register 506 after the end of the frame is reached. When the size of a frame is greater than 1 buffer, the queuing state machine 604 resets the 5-bit register 606 each time the end of each buffer is reached, and for the last buffer in a chain of buffers, resets the 5-bit register 606 when the end of the frame is reached. The 13-bits in 13-bit register 602 and the 5-bits in 5-bit register 604 are combined to form the 18-bit external memory address and sent to external memory controller 608 (includes SSRAM interface 78 and scheduler 80). Both buffer header information and frame data are then written to the external memory 36 at the address delineated by each 18-bit external memory address under control of the queuing state machine 604.

Figure 7:
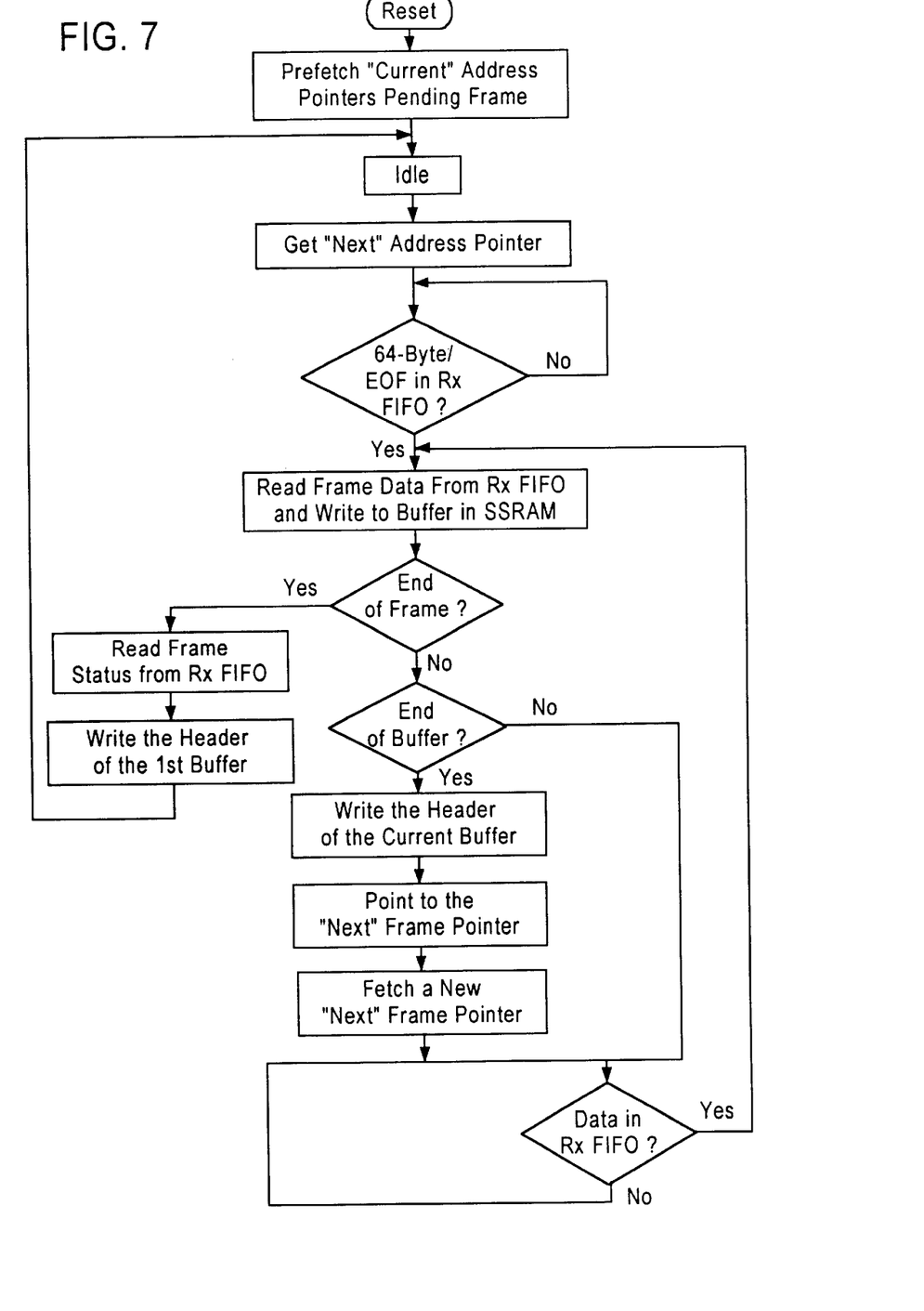
FIG. 7 is a flow diagram of operation of the MAC Queuing Logic.

Operation of the MAC Queuing Logic 74 for generating the external memory address is shown in the flow diagram of FIG. 7. After resetting, the MAC Queuing Logic for each port pre-fetches a pointer to the "current" buffer from the Free Buffer Queue in advance of any received data. The MAC Queuing Logic for each port also pre-fetches a pointer to the "next" buffer from the Free Buffer Queue. These pointers are "cached" by the MAC Queuing Logic pending the arrival of a frame.

When the MAC receive FIFO has captured at least 64-bytes of a frame, or the end of a frame is asserted, the MAC Queuing Logic will begin moving data from the FIFO to the external memory starting at its next scheduled slot. When the MAC Queuing Logic is granted access to the Write Bus, a transfer will occur to the "current" buffer. The actual external memory address is generated using the arrangement of FIG. 6.

When transfer to a buffer completes (End of buffer=Yes), the "next" buffer pointer has already been pre-fetched and is used as the new "current" pointer and a new "next" buffer pointer is pre-fetched from the Free Buffer Queue. The actual external memory address of the "next" buffer is generated also using the arrangement of FIG. 6.

If the MAC Queuing Logic fails to pre-fetch an Address pointer before the MAC receive FIFO overflows, an error signal is provided to the IRC (internal rules checker) which generates a null port vector in order to reclaim the partially filled buffers used for this truncated frame.

During the final transfer of frame data the MAC Queuing Logic also asserts an internal end of frame (EOF) signal and, if necessary, an error signal. The IRC uses the error signal to determine whether to pass the port vector FIFO a valid forwarding descriptor or a forwarding descriptor with a null port vector that will allow the frame buffers to be reclaimed if an error occurred.

When the final data transfer for the frame has completed (End of frame Yes), the frame length and the status information are written into the buffer header for the first buffer in the linked list of buffers that belong to the frame. Status information includes the G Bit which indicates whether or not the frame is good.

Thus, the external memory address for the frame data is generated using the frame pointer and without complicated logic circuitry. Therefore, the present invention increases efficiency of chip area utilization. In this disclosure, there are shown and described only the preferred embodiments of the invention, but it is to be understood that the invention is capable of changes and modifications within the scope of the inventive concept as expressed herein.

What is claimed is:

1. A multiport data communication system storing received data packets in a memory having a plurality of storage areas, the data communication system comprising:

a plurality of receive ports for receiving the data packets;

a queue of start addresses of storage areas in the memory available for storing the received data packets;

an address generator for generating memory addresses for storing the received data packets in the plurality of storage areas of the memory, the address generator including:
a first register receiving a start address from the queue and providing a first part of the memory address, and
a second register counting write cycles to the memory and providing the count result as a second part of the memory address;

a plurality of queuing devices corresponding to the plurality of receive ports each queuing groups of data corresponding to a received data packet, each queuing device being separate from the memory; and a logic unit controlling transfer of the groups of data from the corresponding queuing device to the memory, wherein the address generator is part of the logic unit, each storage area in the memory stores a predetermined number of groups of data, and when a number of groups of data representing a received data packet is greater than said predetermined number of groups of data, said number of groups of data are stored in a plurality of storage areas by using the second part of the memory address to write the address of a subsequent storage area storing subsequent groups of data of said received data packet in the storage area storing the immediately preceding groups of data.

2. The system of claim 1, wherein the second part of the memory address provides an offset from the address of each storage area where each group of data is written.

3. In a communication system having a plurality of receive ports receiving data packets, a memory having a plurality of storage areas, and a queue of start addresses of a plurality of storage areas in the memory available for storing the received data packets, a method of generating memory addresses for storing the received data packets in the plurality of storage areas of the memory comprising the steps of:

inputting a start address from the queue to a first register and providing a first part memory address;

counting write cycles to the memory with a second register and providing the count result as a second part of the memory address;

combining the first part memory address and the second part memory address to provide the memory address;

queuing groups of data representing a data packet received by a respective receive port in a queuing device provided corresponding to each receive port, each queuing device being separate from the memory; and transferring the groups of data representing the data packet received by the respective port in the queuing device from the corresponding queuing device to the memory at the provided memory address, wherein each storage area in the memory stores a predetermined number of groups of data, and when a number of groups of data representing a received data packet is greater than said predetermined number of groups of data, said number of groups of data are stored in a plurality of storage areas by using the second part of the memory address to write the address of a subsequent storage area storing subsequent groups of data of said received data packet in the storage area storing the immediately preceding groups of data.

4. The method of claim 3, wherein the second part memory address provides an offset from a start address of each storage area where each group of data is written.

* * * * *